A. C. RUDLAND.
PNEUMATIC TIRE.
APPLICATION FILED SEPT. 20, 1907.
900,888.
Patented Oct. 13, 1908.
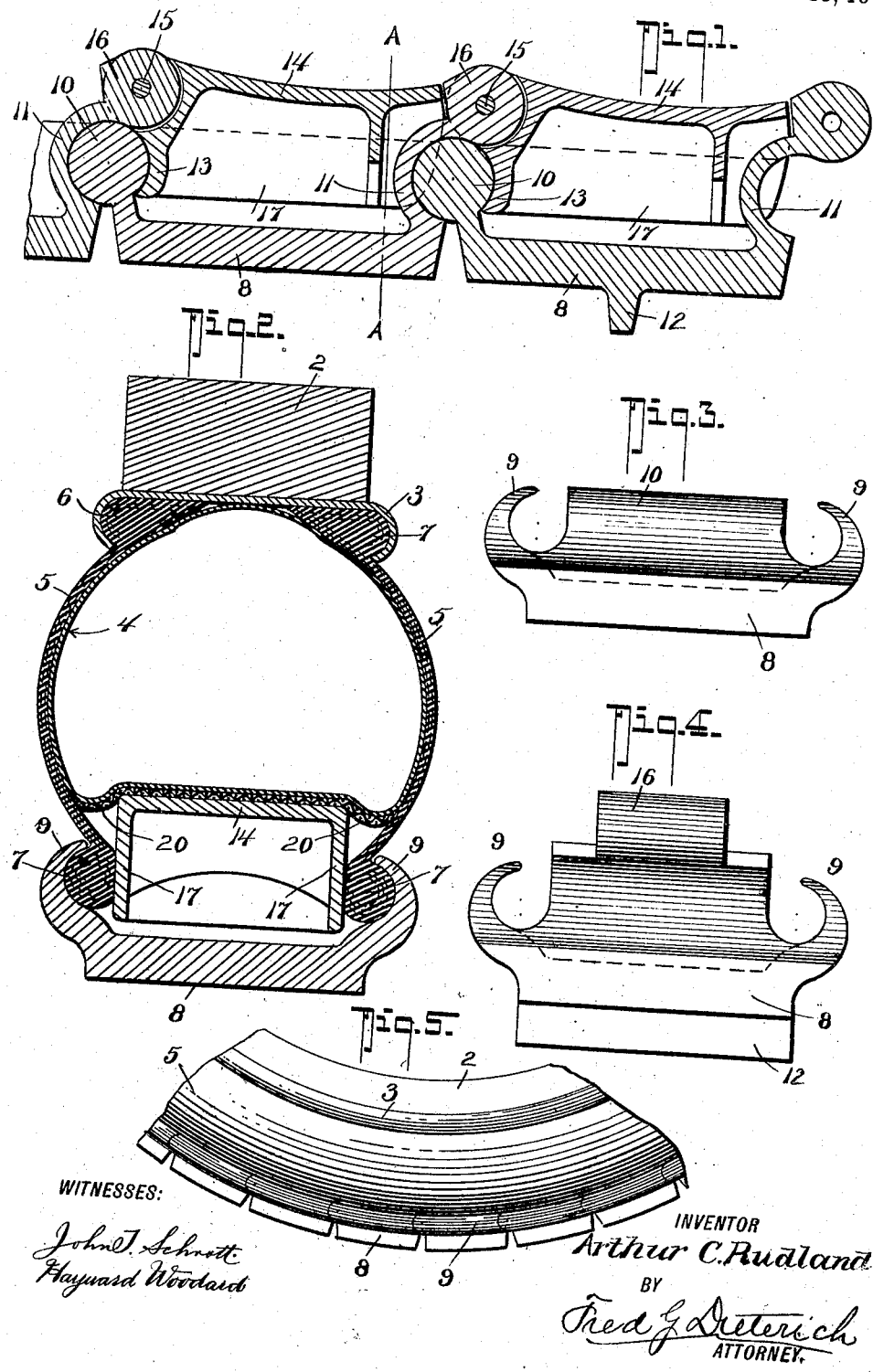

UNITED STATES PATENT OFFICE.

ARTHUR C. RUDLAND, OF VANCOUVER, BRITISH COLUMBIA, CANADA.

PNEUMATIC TIRE.

No. 900,888. Specification of Letters Patent. Patented Oct. 13, 1908.

Application filed September 20, 1907. Serial No. 393,839.

*To all whom it may concern:*

Be it known that I, ARTHUR C. RUDLAND, citizen of the Dominion of Canada, residing at Vancouver, in the Province of British Columbia, Canada, have invented a new and useful Improvement in Pneumatic Tires, of which the following is a specification.

This invention relates to an improvement in that class of pneumatic tire wherein a light inner tube holding the air under pressure is protected with an outer casing to furnish the necessary strength and resist wear, and my object has been to embody a metal tread in the construction of such outer casing.

Attempts have previously been made to apply a metallic sheathing or tread to a double tube tire but in all such with which I am acquainted the tread has been applied as supplementary to the outer casing while my invention embodies such tread as a structural part of it. With this object in view I inclose the inner pneumatic tube of the tire with an outer casing formed of a tread chain of metal links of particular design and side rings of flexible material secured to wheel rim and tread chain by means of beaded edges in the usual manner, which side rings will, under the inflation of the inner tube, assume a tubular form.

The construction of the tire is fully described in the following specification reference being made to the drawings by which it is accompanied, in which:

Figure 1 is a longitudinal section of two adjacent tread links, Fig. 2, a cross section through a tire at a position corresponding to the line A A in Fig. 1, Fig. 3 an end view of one of the tread links looking to the right, Fig. 4, a similar view of the other end and, Fig. 5, a side elevation to a reduced scale of a portion of the tire complete.

In these drawings 2 represents the rim of a wheel to which the tire is applied, 3 being the annular lips which retain the tire in place thereon. The inner pneumatic tube 4 is protected by an outer casing composed of three principal parts, namely, the two side rings 5 and a metallic tread chain composed of links 8. The side rings 5 may be of any suitable flexible material such as is commonly used in the outer casings of a tire and are provided with beaded edges 6 and 7, 6 being the bead by which each ring is secured to the annular lips 3 of the wheel rim and 7 a similar bead by which the chain tread is secured to the rings.

Each link 8 of the chain tread is provided with a lip 9 adapted to receive and hold the bead 7 of the side ring and this lip is curved to the circle of the tire as shown in Fig. 5. The tread portion of the chain links 8 may also be so curved, although shown straight in Fig. 1.

One end of each link 8 is provided on the upper side, that is the side toward the center of the tire, with a joint member 10, designed to form with the adjacent end of the next link to it a hinge joint, and the opposite end of each link has a portion 11 shaped to partially encircle the hinge member 10 of the adjacent end of the next link to it. The portion 11 does not embrace more than one half of the hinge member 10 of the adjacent link, the completion of the hinge joint bearing being formed by the heel 13 of a lever member 14 pivotally connected by a pin 15 to a portion 16 projecting from the upper end of 11. This lever member 14 projects over the next link adjacent to the one to which it is secured and is designed to receive an elastic pressure to close the heel 13 upon 10 and complete the hinge joint, from the expansion of the inner pneumatic tube 4 upon the free end of it when such is inflated. From the outer edges of the lever member 14 project flanges 17 which will bear against the inner sides of the beads 7 of the side rings 5 to retain them in the lips 9 of the link members 8.

The inner pneumatic tube 4 may be protected from direct contact with the lever members 14 and their hinged connections to the links 8 by a band 20 of canvas or other material between the tire and the links of the chain tread. The outer tread of the links 8 may be furnished when thought necessary with projections 12 to prevent skidding.

A tire casing is thus provided having a tread that will secure an efficient driving hold upon the track and that is mail clad to resist puncture and ordinary wear while its flexibility to respond to the elasticity of the pneumatic tube within it, is not only not seriously impaired, but the pressure of such tube against the inner side of the structure of the tread chain is made use of to secure the links thereof and maintain the fit of the hinge connections under wear.

Having now particularly described the construction of my tire and the advantages which I claim for it, I hereby declare that what I claim as my invention and desire to be protected in by Letters Patent, is:

1. In a pneumatic tire, the combination with an inner inflated tube of an outer casing protecting said tube said casing composed of a tread chain formed of a series of short links each having at one end a cylindrical pin bearing and at the other end a corresponding concave bearing adapted to partially encircle the pin bearing of the next link to it the remainder of the pin bearing being encircled by the heel of a lever member pivotally mounted over the convex bearing and extending toward and over the next link at the same end which lever member is adapted to form the bearing of the inner tube on the tread chain, and side rings of flexible material having wired edges which are pressed into engaging lips secured to the rim of the wheel and to corresponding lips in the links of the tread chain.

2. In a pneumatic tire, the combination with an inner inflated tube, of an outer casing composed of a connected chain of links, side rings of flexible material, a rim, said rim and said links having means for receiving the ends of said side rings, said inner tube when inflated serving to retain the side rings with their ends in engagement with the rim and links respectively, said chain of links comprising links proper and lever members pivotally connected with each of said links to interlock with the next adjacent links.

In testimony whereof I have signed my name to this specification in the presence of two subscribing witnesses.

ARTHUR C. RUDLAND.

Witnesses:
ROWLAND BRITTAIN,
CLIVE S. CARMAN.